United States Patent [19]

Maly-Schreiber et al.

[11] Patent Number: 5,549,981
[45] Date of Patent: Aug. 27, 1996

[54] ELECTROCHEMICAL STORAGE DEVICE

[75] Inventors: Martha Maly-Schreiber; Robert A. Huggins, both of Ulm, Germany

[73] Assignee: Daimler-Benz AG, Germany

[21] Appl. No.: 406,477

[22] Filed: Mar. 20, 1995

[30] Foreign Application Priority Data

Mar. 18, 1994 [DE] Germany .......................... 44 09 268.7

[51] Int. Cl.⁶ ............................................. H01M 14/00
[52] U.S. Cl. .................. 429/7; 429/61; 429/153; 429/159
[58] Field of Search ................................. 429/7, 61, 153, 429/159

[56] References Cited

U.S. PATENT DOCUMENTS

| 2,934,580 | 4/1960 | Neumann | 136/6 |
| 4,585,539 | 4/1986 | Edson | 204/228 |
| 4,598,029 | 7/1986 | Doddapaneni et al. | 429/50 |
| 4,879,188 | 11/1989 | Meinhold et al. | 429/7 |

FOREIGN PATENT DOCUMENTS

| 0297421 | 1/1989 | European Pat. Off. . |
| 1583836 | 12/1969 | France . |
| 2819584C2 | 11/1979 | Germany . |
| 3701056A1 | 7/1988 | Germany . |
| 4229437C1 | 11/1993 | Germany . |
| 88/00400 | 1/1988 | WIPO . |

OTHER PUBLICATIONS

Derwent Publication, Ltd., London, GB; AN 93-113999; JP-A-05-054911, 5 Mar. 1993.
European Search Report dated Jul. 14, 1995 (with English translation).

*Primary Examiner*—Kathryn Gorgos
*Attorney, Agent, or Firm*—Evenson, McKeown, Edwards & Lenahan P.L.L.C.

[57] ABSTRACT

The invention relates to an electrochemical storage device having a plurality of serially connected individual cells, each of the individual cells having two spatially separated electrodes, between which an electrolyte and an intermediate part ensuring the spacing of the electrodes is arranged. In the interior of the storage device, each individual cell has a protective element which is formed from a solid material having a nonlinear current/voltage characteristic curve, and which makes electrical contact with the positive and the negative electrode within the individual cell and provides a voltage-dependent electrical connection between said electrodes. The electrical resistance of the protective element above a critical voltage is smaller, and below the critical voltage larger, than the resistance present between the electrodes at the respective voltages without the protective element. To protect the individual cells against overcharging, the critical voltage is smaller than the decomposition voltage of the associated individual cell.

14 Claims, 3 Drawing Sheets

ELECTROCHEMICAL STORAGE DEVICE

BACKGROUND AND SUMMARY OF THE INVENTION

The invention relates to an electrochemical storage device of the type having a plurality of serially connected cells, in which each has two spacially separated electrodes.

German patent document DE 42 29 437 C1 discloses an electrochemical storage device of this generic type, in which a storage device housing surrounding the cells has terminals of differing polarity extending therefrom. Because of the series connection of the individual cells, the maximum voltage of such a storage device is calculated as the number of individual cells multiplied by their specific voltage. Thus, these electrochemical storage devices can have a maximum voltage of a few hundreds of volts, and are, therefore, of particular interest for traction batteries for motor vehicles.

Since the components of the individual cells (electrodes, electrolyte, weight of the active masses, distribution etc.) cannot be manufactured to be completely identical, the individual cells during charging attain their maximum charge state at different times. If those cells which are already completely charged continue to be subjected to a charge voltage that exceeds the decomposition voltage of the individual components of the individual cells, they may be damaged, or even destroyed. In the case of electrochemical storage devices having a bipolar sandwich construction (positive electrode, bipolar plate, negative electrode, electrolyte, positive electrode etc.), this risk is considerable, since the current flows transversely through the thin functional plates or sheets placed next to one another in layers, and the electrodes are not equipped with current collector lugs between which a protective element can be interposed. Furthermore, appropriate contacting would at least be very complicated, since the thickness of the individual cell elements may be less than 1 mm. In some cases, the electrolytes and/or the electrodes are even fashioned as a thin sheet.

German patent document DE 28 19 584 C2 discloses a protective circuit for a plurality of electrochemical storage devices connected in series, or sets of electrochemical storage devices connected in parallel, for which each electrochemical storage cell connected in series, and each set of electrochemical storage cells connected in parallel, is assigned a protective element which is arranged from outside and is electrically connected in parallel thereto. The purpose of the protective element in this arrangement is to allow any overvoltage which is applied to the terminals of the storage devices to be discharged via the protective element, so that the storage cell is not destroyed.

The storage devices themselves in their interior have a plurality of individual cells connected in parallel to one another, which consist at least of electrodes spaced with respect to one another and electrolyte arranged between the electrodes. As these individual cells also cannot be manufactured completely identically, they too, during charging, reach their maximum charge state at different times. To ensure against destruction of individual cells, the maximum charge voltage, particularly in the case of electrochemical storage devices containing gel electrolytes and solid electrolytes, depends on the weakest link. Consequently, all the components of these individual cells have to be adequately dimensioned for the desired charge voltage to be applied safely. This does entail an increase in mass, owing to which the actual mass of the electrochemical storage device exceeds the calculated required mass.

The object of the present invention is to provide an improved electrochemical storage device which makes it possible in a simple manner, especially with electrochemical storage devices of sandwich construction, to reliably avoid at least any destruction due to overvoltage, while keeping the total mass of the storage device as low as possible.

The object is achieved by the electrochemical storage device according to the invention in which a protective element whose electrical conductivity is voltage-dependent is arranged in direct contact with the two electrodes of each individual cell. In this manner, the electrochemical storage device is protected in a simple manner even when it is being assembled, and an external overcharge protection is no longer required. The resultant percentage increase in weight of the electrochemical storage device, if any, is small.

Other objects, advantages and novel features of the present invention will become apparent from the following detailed description of the invention when considered in conjunction with the accompanying drawings.

DETAILED DESCRIPTION OF THE DRAWINGS

Figure 1:
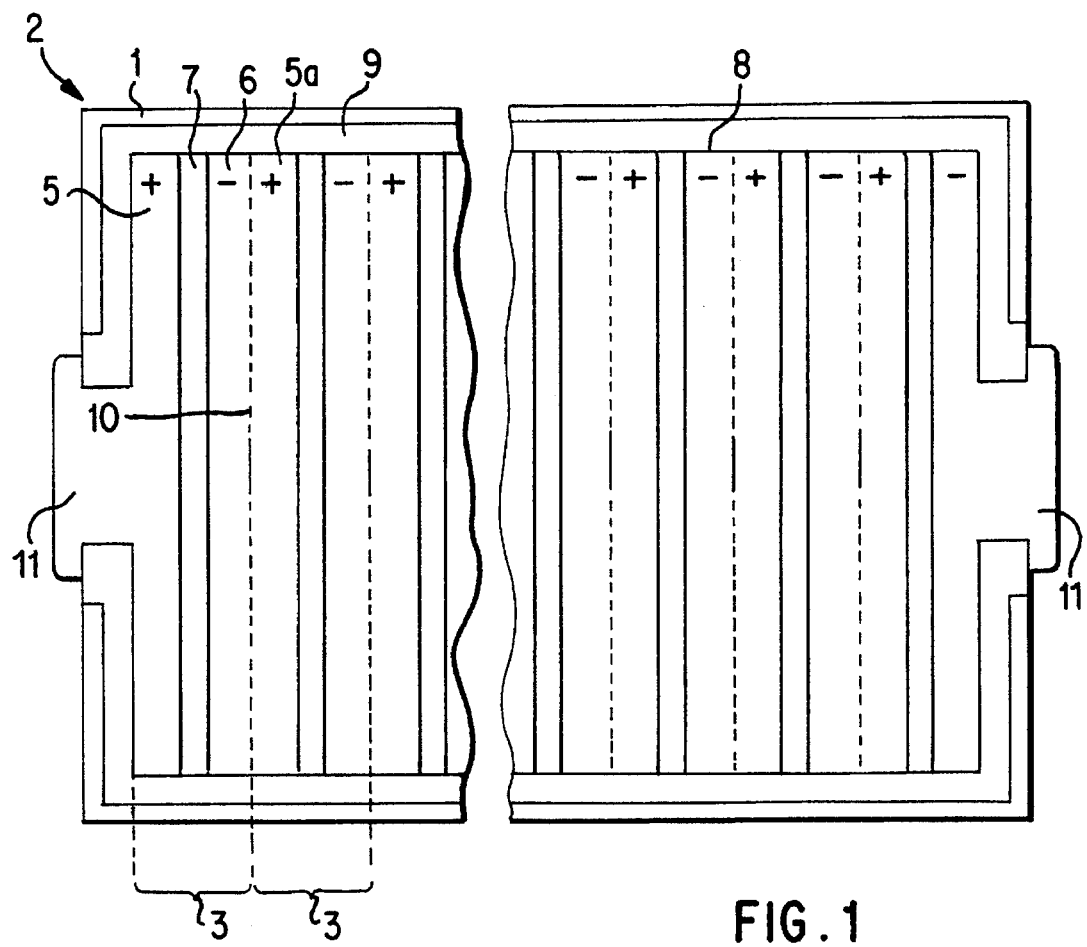
FIG. 1 is a sectional top view of an electrochemical storage device of bipolar sandwich construction.

FIG. 1 shows a section through an electrochemical storage device 2 of bipolar sandwich construction. Within the housing 1 of the storage device 2, a plurality of serially connected individual cells 3 are arranged successively adjacent to one another, within an insulation trough 9. Each individual cell 3 in this arrangement has a thin positive electrode 5 and a thin negative electrode 6, with electrolyte 7 arranged therebetween. In the present case, the electrolyte 7 advantageously is a solid electrolyte which can be produced as a sheet, or alternatively can be applied to a sheet and, therefore, requires little space and mass. In principle, however, the electrolyte 7 could also be a gel, a liquid or a dry electrolyte. The series connection of adjacent individual cells 3 is advantageously effected by means of the electrodes 5, 6 which may have a bipolar plate 10 sandwiched within the entire contact area between adjacent cells, such as, for example, the positive electrode 5a of the second individual cell 3 and the negative electrode 6 of the first individual cell 3. For the purpose of current collection, the outer electrodes 5, 6 of the two individual cells 3 arranged at either end have current collectors 11 arranged thereon, which are connected to the two terminals of the storage device 1 or may even form it themselves. Especially when they are used as traction batteries for motor vehicles, electrochemical storage devices 2 of this type may have a voltage between 100 V and 500 V, usually of about 300 V.

According to a first embodiment of the invention, in order to protect the individual cells 3 against overcharging and consequent destruction, the electrochemical storage device 2 has a protective element 4 in the form of a distribution of granules or particles arranged in its interior in the space occupied by the electrolyte 7 between the electrodes 5, 6 of each individual cell 3. (See FIGS. 2, 3,) The granules which make up the protective element 4 are made of a material having a nonlinear current/voltage characteristic curve, and make contact with the electrodes 5, 6 of the individual cell 3, and provide a voltage-dependent electrical connection between them.

The protective element 4 has a voltage-dependent resistance, so that in the event that an individual cell is charged to such an extent that a charge voltage which exceeds its decomposition voltage is applied to its electrodes 5, 6, the protective element 4 effectively forms a short-circuit and the current is thus diverted via the protective element 4. If the voltage between the two electrodes 5, 6 of an individual cell 3 is less, by a certain amount, than the decomposition voltage, the protective element 4 has a resistance which is much greater than the resistance of the individual cell 3 at this voltage without the protective element 4. Consequently, any flow of current through the protective element 4 below the decomposition voltage is largely precluded, and the storage device 2 can thus be charged.

Advantageously, the protective element 4 has an electrical resistance at voltage levels substantially below the critical voltage which is more than three times the resistance between the electrodes 5, 6 without a protective element at the same voltages, while the electrical resistance of the protective element 4 at the critical voltage is less than one tenth of the resistance between the electrodes 5, 6 without a protective element 4. Suitable materials for the granules which make up the protective element 4 are varistor materials or semiconductor materials, especially some amorphous semiconductors, such as the complex amorphous chalcogenides that show non-linear switching behavior.

Figure 2:
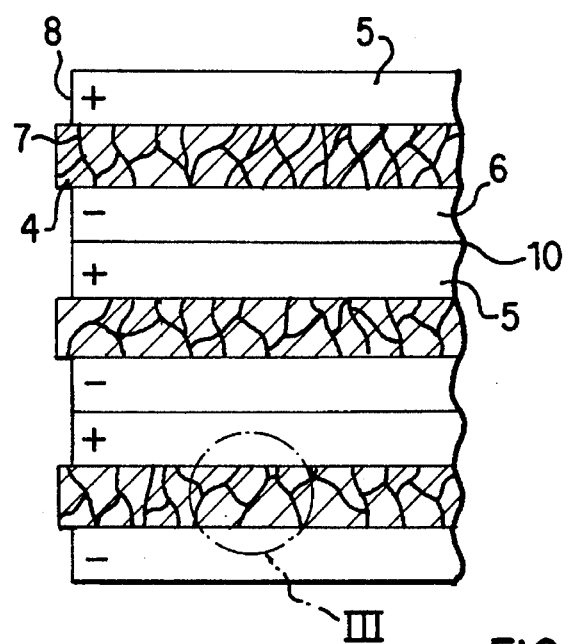
FIG. 2 shows an enlarged cross-section through a plurality of individual cells having a protective element integrated in the electrolyte.
Figure 3:
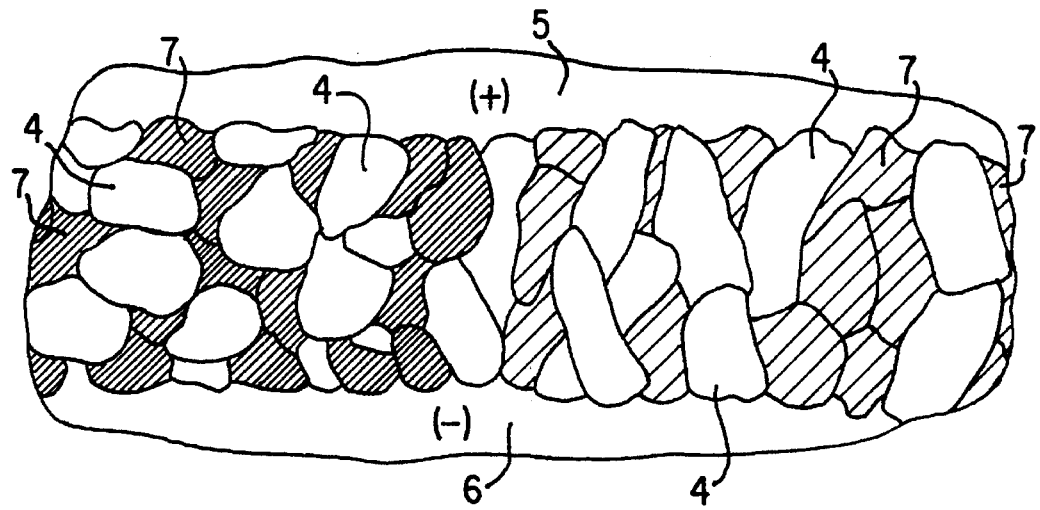
FIG. 3 shows a further enlarged detail of the electrolyte according to FIG. 2 with an integrated, granulated protective element.

FIG. 2 depicts a section through an electrochemical storage device 2 of bipolar sandwich construction and having a plurality of individual cells 3, with the protective element 4 being integrated into an electrolyte 7. As depicted in FIG. 3, the material of the protective element 4 has been ground into small particles, whose mean diameter is expediently in the range of approximately 0.1 to 50 μm. The material of the protective element 4 is added in granulated form during the preparation of the electrolyte 7, being randomly distributed in the process within the volume of the electrolyte 7. At the same time, the grains of the material of the protective element 4 make contact with each other, as a result of which, seen over the thickness of the entire electrolyte 7, voltage-dependent conduction arises from one side of the electrolyte 7 to its other side. Since the sides of the electrolyte 7 within an individual cell 3 have the electrodes 5, 6 lying thereon, conduction through the grains of the material of the protective element 4 connects the two electrodes 5, 6 of the individual cell 3 to one another in a voltage-dependent manner. The protective element 4 formed of grains also constitutes a supporting matrix.

If the electrochemical storage device 2 contains a gaseous, gel-like or liquid electrolyte 7, these grains of the material of the protective element 4, which must be insoluble in the electrolyte 7, may be joined, for example, at their grain boundaries, in particular by sintering, and thus form a porous separator. Via this separator, the electrolyte 7 can then connect, virtually unhindered, depending on the porosity of the separator, one electrode 5 with the other electrode 6 of an individual cell 3.

Furthermore, such a separator reliably spaces the two electrodes 5, 6 of an individual cell 3 with respect to one another, and also forms the protective element 4 in which, when a decomposition voltage is applied to the corresponding electrodes 5, 6 of an individual cell 3, it virtually short-circuits the two electrodes 5, 6 with respect to one another.

Figure 4:
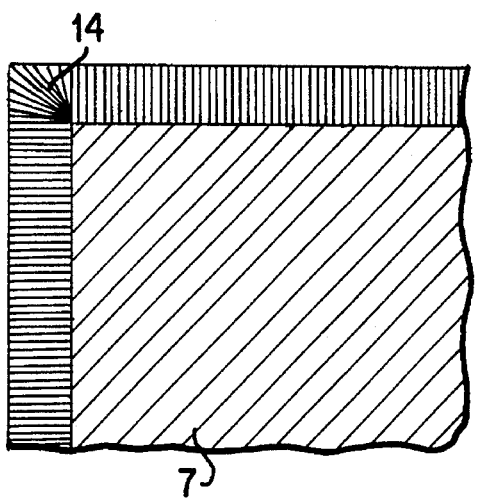
FIG. 4 shows a protective element which is designed as a frame and can be arranged between two electrodes.

A further embodiment of the invention is depicted in FIG. 4, in which the protective element 14 is designed as a frame-like supporting matrix. In this embodiment, the protective element 14 is made from a solid material of the type mentioned previously, and has a layer thickness in the range of 0.1 to 50 μm. The external dimensions of the protective element 14, which is made of a material having a voltage-dependent electrical resistance and is fashioned as a frame, correspond approximately to the external dimensions of the associated electrodes 5, 6.

In the assembled storage element 2, the frame-like protective element 14 is in contact with the electrodes 5, 6. Thus, at the critical voltage, it connects these electrodes to one another in an electrically conductive manner. Below the critical voltage, the resistance of the frame-like protective element 24 is so high that it insulates the electrodes 5, 6 in question with respect to one another, so chat the charge transfer takes place via the electrolyte 7 arranged within the webs of the frame-like protective element 14.

Owing to the frame-like design of the protective element 14, the electrolyte 7 in such storage devices 2 can, inter alia, also be liquid without it being necessary to take other complex constructional measures known per se, such as individual insulating pockets each accommodating an individual cell 3, since the protective element 14, in conjunction with the two electrodes 5, 6, is able to completely enclose the electrolyte 7 in a sealing manner.

Figure 5:
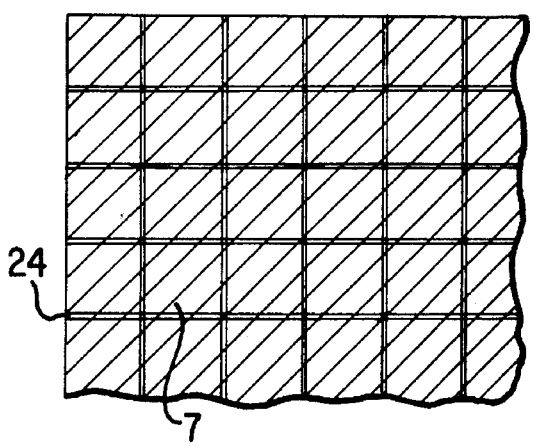
FIG. 5 shows a protective element designed as a grid.

FIG. 5 depicts still another embodiment of the invention, having protective element 24, which can be constructed in a simple manner for flat individual cells 3. In this embodiment, the protective element 24 is fashioned as a grid or correspondingly as a net which is inserted between two electrodes 5, 6 of each individual cell 3 of the electrochemical storage device 2 and has direct contact with the electrodes 5, 6 of an individual cell 3. The electrolyte 7 of each individual cell 3, which is advantageously a solid or a gel electrolyte, is arranged in the voids of the grid-like protective elements 24 or correspondingly, in the honeycombs of the net-like, protective element 24.

Figure 6:
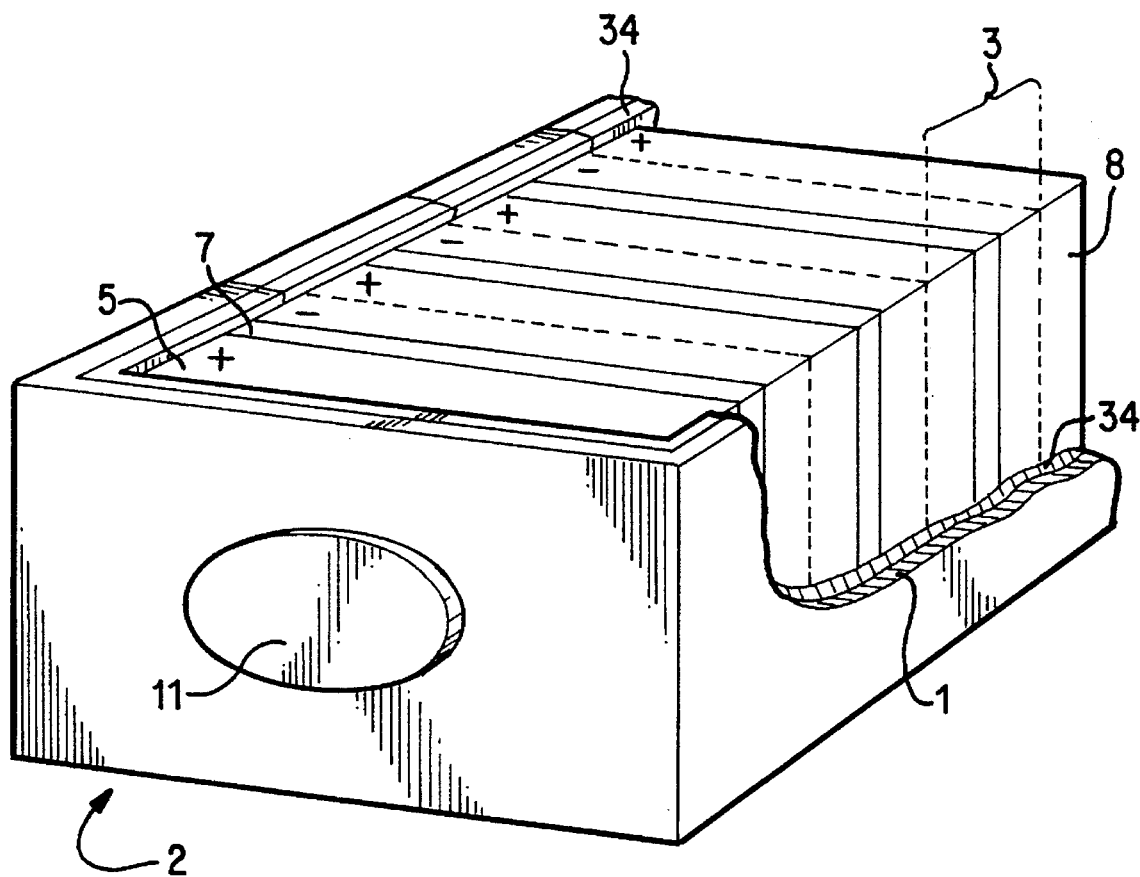
FIG. 6 shows a protective element designed as trough, with individual cells arranged on the inside.

FIG. 6 depicts a protective element 34 fashioned as a trough or receptacle, with the individual cells 3 and their functional elements such as electrodes 5, 6, electrolyte 7, optional separator etc., accommodated therein. For the element 34 to fulfil its protective function, the narrow sides of the electrodes 5, 6 of the individual cells 3 lie against and make electrical contact with the walls of the trough-like protective element 34.

In principle, the protective element 34 may also be designed as a frame containing all individual cells 3 of the electrochemical storage device 2, or alternatively only as a plate inserted on one side or as a web lying against the narrow sides of the electrodes 5, 6 on one side so as to make contact.

In the case of the trough design, it is advantageous, though, that if the gel or solid electrolyte normally used is dispensed with and a liquid electrolyte is used, the walls of the protective element 34 fashioned as a trough can fit the narrow sides of the electrodes 7 so closely that they prevent the liquid electrolyte 7 arranged between the electrodes 5, 6 of an individual cell 3 from escaping from the individual cell 3, and thus from producing a short-circuit between the individual cells 3.

Since the material of the protective element 34 is quasi-insulating below the critical voltage, the individual cells 3 likewise below this voltage continue to be connected in series and are not short-circuited via the protective element 34.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Electrochemical storage device having a plurality of individual cells connected in series, each of the individual cells having spatially separated positive and negative electrodes, with at least an electrolyte and an intermediate part ensuring the spacing of the electrodes arranged therebetween, wherein:

each cell has a protective element, which is formed from a solid material which makes electrical contact with the positive and negative electrodes within the individual cell, providing a nonlinear voltage-dependent electrical connection between said electrodes;

said solid material comprises a varistor material which has a nonlinear current voltage characteristic wherein, when a voltage applied to said cell is greater than a critical voltage for the cell, electrical resistance of the protective element is smaller than a resistance between the electrodes without the protective element, and when a voltage applied to said cell is smaller than said critical voltage, the electrical resistance of the protective element is greater than the resistance between the electrodes without the protective element;

the critical voltage is smaller than a decomposition voltage of the associated individual cell; and the protective element is integrated into said intermediate part ensuring the spacing of the electrodes.

2. Electrochemical storage device according to claim 1, wherein:

said varistor material has a first electrical resistance at voltage levels which are below the critical voltage, which first resistance is at least three times the resistance between the electrodes without a protective element and has a second electrical resistance at voltage levels which are at or above the critical voltage, which second resistance is less than one tenth the resistance between the electrodes without a protective element.

3. Electrochemical storage device according to claim 1, wherein the protective element is formed from a varistor material or a semiconductor material.

4. Electrochemical storage device according to claim 3, wherein the protective element is formed from an amorphous semiconductor material with non-linear switching characteristics.

5. Electrochemical storage device according to claim 1, wherein the protective element is designed as a shape-retaining framework having openings for the electrolyte.

6. Electrochemical storage device according to claim 1, wherein the protective element is porous, and wherein the electrolyte is arranged in the pores of the protective element.

7. Electrochemical storage device according to claim 1, wherein the protective element forms a frame which is in contact with the electrodes of the individual cells on the outside.

8. Electrochemical storage device according to claim 1, wherein the protective element forms a trough or frame which accommodates the electrodes and the electrolyte of the storage device and whose walls are in contact with the electrodes of the individual cells and acts as a container for the electrolyte.

9. Electrochemical storage device according to claim 1, wherein the electrolyte is a solid electrolyte in the form of a flexible sheet.

10. Electrochemical storage device according to claim 1, wherein the protective element forms a strip which is in contact with the electrodes of the individual cells on the outside and against which lie the narrow sides of the electrodes and the electrolyte.

11. Electrochemical storage device according to claim 1, wherein the protective element is integrated into one of a separator or an electrolyte of said cell.

12. Electrochemical storage device having a plurality of individual cells connected in series, each of the individual cells having spacially separated positive and negative electrodes, with at least an electrolyte and an intermediate part ensuring the spacing of the electrodes arranged therebetween, wherein:

each cell has a protective element, which is formed from a solid material which makes electrical contact with the positive and negative electrodes within the individual cell, providing a nonlinear voltage-dependent electrical connection between said electrodes;

said solid material comprises a varistor material which has a nonlinear current/voltage characteristic wherein, when a voltage applied to said cell is greater than a critical voltage for the cell, electrical resistance of the protective element is smaller than a resistance between the electrodes without the protective element, and when a voltage applied to said cell is smaller than said critical voltage, the electrical resistance of the protective element is greater than the resistance between the electrodes without the protective element;

the critical voltage is smaller than a decomposition voltage of the associated individual cell; and said protective element comprises a plurality of granules distributed within said electrolyte, said granules being in electrical contact with each other and with said positive and negative electrodes.

13. Electrochemical storage device according to claim 12, wherein said granules are joined to each other to form a rigid porous matrix.

14. Electrochemical storage device according to claim 13, wherein said granules are sintered to form said matrix.

* * * * *